United States Patent
Han et al.

(10) Patent No.: US 11,699,788 B2
(45) Date of Patent: Jul. 11, 2023

(54) POSITIVE ELECTRODE MATERIAL FOR SECONDARY BATTERY AND LITHIUM SECONDARY BATTERY INCLUDING THE SAME

(71) Applicant: LG Chem, Ltd., Seoul (KR)

(72) Inventors: Jung Min Han, Daejeon (KR); Wang Mo Jung, Daejeon (KR); Dong Hun Lee, Daejeon (KR); Sung Bin Park, Daejeon (KR); Ji Hye Kim, Daejeon (KR); Dong Hwi Kim, Daejeon (KR); Hyung Man Cho, Daejeon (KR)

(73) Assignee: LG Energy Solution, Ltd.

( * ) Notice: Subject to any disclaimer, the term of this patent is extended or adjusted under 35 U.S.C. 154(b) by 517 days.

(21) Appl. No.: 16/758,247

(22) PCT Filed: Nov. 21, 2018

(86) PCT No.: PCT/KR2018/014371
§ 371 (c)(1),
(2) Date: Apr. 22, 2020

(87) PCT Pub. No.: WO2019/103460
PCT Pub. Date: May 31, 2019

(65) Prior Publication Data
US 2020/0266438 A1     Aug. 20, 2020

(30) Foreign Application Priority Data

Nov. 21, 2017 (KR) .......................... 10-2017-0155955

(51) Int. Cl.
  H01M 4/525   (2010.01)
  H01M 4/505   (2010.01)
  H01M 10/0525 (2010.01)
  H01M 4/02    (2006.01)

(52) U.S. Cl.
  CPC ........... *H01M 4/525* (2013.01); *H01M 4/505* (2013.01); *H01M 10/0525* (2013.01); *H01M 2004/028* (2013.01)

(58) Field of Classification Search
  None
  See application file for complete search history.

(56) References Cited

U.S. PATENT DOCUMENTS

| | | | |
|---|---|---|---|
| 2009/0258296 A1 | 10/2009 | Kawasato et al. | |
| 2014/0038052 A1 | 2/2014 | Song et al. | |
| 2014/0158932 A1 | 6/2014 | Sun et al. | |
| 2015/0340686 A1 | 11/2015 | Sun et al. | |
| 2016/0006025 A1 | 1/2016 | Sun | |
| 2016/0156030 A1 | 6/2016 | Sun et al. | |
| 2018/0019464 A1 | 1/2018 | Xia et al. | |
| 2018/0145313 A1* | 5/2018 | Hwang | H01M 50/1245 |
| 2018/0241036 A1 | 8/2018 | Jo et al. | |
| 2019/0341598 A1* | 11/2019 | Nam | H01M 4/131 |

FOREIGN PATENT DOCUMENTS

| | | |
|---|---|---|
| CN | 102569774 A | 7/2012 |
| CN | 104051720 A | 9/2014 |
| CN | 105009333 A | 10/2015 |
| CN | 105229830 A | 1/2016 |
| CN | 105958062 A | 9/2016 |
| CN | 106410170 A | 2/2017 |
| JP | 2003045425 A | 2/2003 |
| JP | 2005089225 A | 4/2005 |
| KR | 20090032138 A | 3/2009 |
| KR | 20090082790 A | 7/2009 |
| KR | 20140018628 A | 2/2014 |
| KR | 20140085347 A | 7/2014 |
| KR | 101510940 B1 | 4/2015 |
| KR | 20170063373 A | 6/2017 |
| KR | 20170118091 A | 10/2017 |

OTHER PUBLICATIONS

International Search Report for Application No. PCT/KR2018/014371 dated Feb. 22, 2019, 2 pages.
Extended European Search Report including Written Opinion for Application No. EP18881658.1, dated Oct. 22, 2020, pp. 1-7.
Hu et al., Improving the electrochemistry performance of layer LiNi0.5Mn0.3Co0.2O2 material at 4.5V cutoff potential using lithium metaborate, Electrochimica Acta, available online May 13, 2017, pp. 105-111, vol. 243, Elsevier, XP085065144.

* cited by examiner

Primary Examiner — Carlos Barcena
(74) Attorney, Agent, or Firm — Lerner David LLP

(57) ABSTRACT

A positive electrode material for a secondary battery, including a first positive electrode active material and a second positive electrode active material, wherein the first positive electrode active material and the second positive electrode active material consist of a lithium composite transition metal oxide including at least two or more transition metals selected from the group consisting of nickel (Ni), cobalt (Co) and manganese (Mn) are provided. The average particle size ($D_{50}$) of the first positive electrode active material is two or more times larger than that of the second positive electrode active material, and the first positive electrode active material has a concentration gradient in which at least one of Ni, Co or Mn contained in the lithium composite transition metal oxide has a concentration difference of 1.5 mol % or more between the center and the surface of a particle of the lithium composite transition metal oxide.

20 Claims, 2 Drawing Sheets

POSITIVE ELECTRODE MATERIAL FOR SECONDARY BATTERY AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2018/014371, filed Nov. 21, 2018, which claims priority to Korean Patent Application No. 10-2017-0155955, filed Nov. 21, 2017, the disclosures of which are incorporated herein by reference.

TECHNICAL FIELD

The present invention relates to a positive electrode material for a secondary battery and a lithium secondary battery including the same.

BACKGROUND ART

Recently, with the rapid spread of electronic devices using batteries such as mobile phones, notebook computers, and electric vehicles, the demand for secondary batteries which have a small size and a light weight, and relatively high capacity has been rapidly increasing. Particularly, since a lithium secondary battery has a small size and a light weight, and a high energy density, it is attracting attention as a driving power source for portable devices. As a result, research and development efforts have been actively made to improve the performance of a lithium secondary battery.

A lithium secondary battery includes an organic electrolyte solution or a polymer electrolyte solution filled between the positive electrode and the negative electrode, which consist of an active material enabling the intercalation and deintercalation of a lithium ion, and produces electric energy through oxidation and reduction when a lithium ion is intercalated/deintercalated in/from the positive electrode and the negative electrode.

As a positive electrode active material of a lithium secondary battery, a compound of lithium cobalt oxide ($LiCoO_2$), lithium nickel oxide ($LiNiO_2$), lithium manganese oxide ($LiMnO_2$ or $LiMn_2O_4$), lithium ferric phosphate ($LiFePO_4$) or the like has been used. In addition, as a method of retaining an excellent reversible capacity of $LiNiO_2$ and improving low thermal stability, a lithium composite metal oxide in which some of nickel (Ni) is substituted with cobalt (Co) or manganese (Mn)/aluminum (Al) (hereinafter, simply referred to as a "NCM-based lithium composite transition metal oxide" or "NCA-based lithium composite transition metal oxide") has been developed.

Studies have been conducted to increase a capacity per unit volume of the lithium composite transition metal oxide, and enhance stability by forming a concentration gradient of a metal constituent, increasing a nickel content, or increasing the rolling density of a positive electrode active material layer. However, it is still necessary to develop a positive electrode active material which has high capacity and satisfies excellent thermal stability.

DISCLOSURE

Technical Problem

The present invention is directed to providing a positive electrode material for a secondary battery which increases the electrode density of a positive electrode, has high capacity, improves thermal stability, and prevents particle cracking of the positive electrode active material to inhibit a side reaction with an electrolyte solution.

Technical Solution

The present invention provides a positive electrode material for a secondary battery, which includes a first positive electrode active material and a second positive electrode active material, wherein the first positive electrode active material and the second positive electrode active material consist of a lithium composite transition metal oxide including at least two or more transition metals selected from the group consisting of nickel (Ni), cobalt (Co) and manganese (Mn), the average particle size ($D_{50}$) of the first positive electrode active material is two or more times larger than that of the second positive electrode active material, and the first positive electrode active material has a concentration gradient in which at least one of Ni, Co or Mn contained in the lithium composite transition metal oxide has a concentration difference between the center and the surface of a particle of the lithium composite transition metal oxide of 1.5 mol % or more.

In addition, the present invention provides a positive electrode including the positive electrode material and a lithium secondary battery.

Advantageous Effects

According to the present invention, by using a mixture of a large particle with a concentration gradient, which is a first positive electrode active material, and a small particle without a concentration gradient, which is a second positive electrode active material, the electrode density of a positive electrode can be increased, and high capacity and excellent thermal stability can be ensured. In addition, the small particle without a concentration gradient can prevent particle cracking of the large particle with a concentration gradient, thereby inhibiting a side reaction with an electrolyte solution.

A lithium secondary battery produced using the positive electrode material for a secondary battery according to the present invention can have high capacity and an enhanced battery characteristic such as a lifespan characteristic.

MODES OF THE INVENTION

Figure 1:
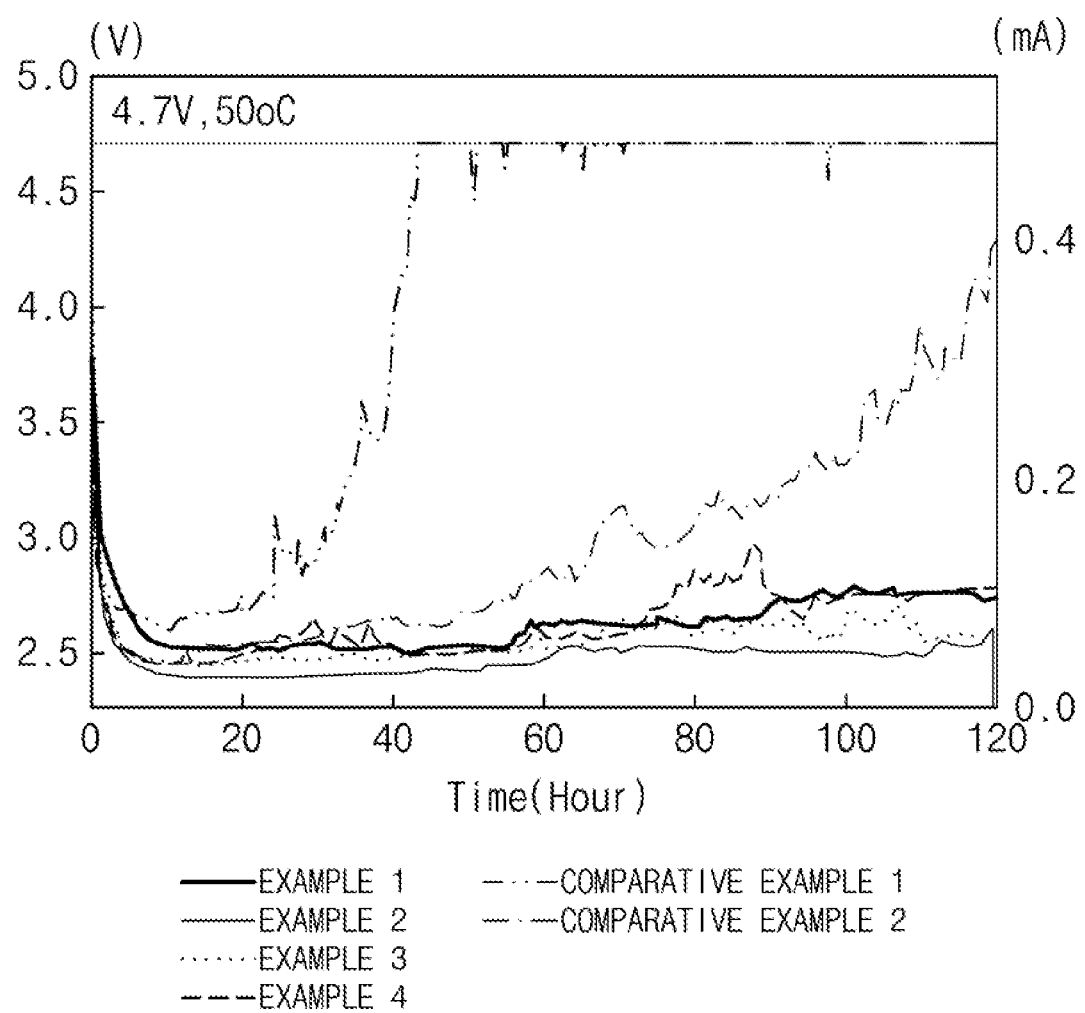
FIG. 1 is a graph of measuring a leakage current for lithium secondary battery cells using a positive electrode, which are produced according to examples and comparative examples.

Hereinafter, the present invention will be described in further detail to help understanding of the present invention. Here, terms and words used in the specification and claims should not be construed as limited to general or dictionary meanings, and should be interpreted with the meaning and concept in accordance with the technical idea of the present invention based on the principle that the inventors have appropriately defined the concepts of terms in order to explain the invention in the best way.

The positive electrode material for a secondary battery of the present invention includes a first positive electrode active material and a second positive electrode active material, wherein the first positive electrode active material and the second positive electrode active material consist of a lithium composite transition metal oxide including at least two or more transition metals selected from the group consisting of nickel (Ni), cobalt (Co) and manganese (Mn), the average particle size ($D_{50}$) of the first positive electrode active material is two or more times higher than that of the second positive electrode active material, and the first positive electrode active material has a concentration gradient in which at least one of Ni, Co or Mn contained in the lithium composite transition metal oxide has a concentration difference between the center and the surface of a particle of the lithium composite transition metal oxide of 1.5 mol % or more.

The positive electrode material for a secondary battery of the present invention includes a large particle, which is the first positive electrode active material, and a small particle, which is the second positive electrode active material.

To enhance the capacity per volume of the positive electrode for a secondary battery, it is necessary to increase the density of the positive electrode active material layer, and as a method of increasing the density of a positive electrode active material layer, a method of increasing a rolling density (or electrode density) by reducing a void between particles of positive electrode active materials has been used. In the case of a bimodal positive electrode material in which large particles and small particles of positive electrode active materials are mixed as described in the present invention, an empty space between the large particles of the positive electrode active material may be filled with the small particles of the positive electrode active material, and therefore, more dense packing is possible, and the density of the positive electrode may be increased.

The average particle size ($D_{50}$) of the first positive electrode active material is two or more times higher than that of the second positive electrode active material.

In the present invention, the average particle size ($D_{50}$) may be defined as a particle size corresponding to 50% of volumetric accumulation in a particle size distribution curve. The average particle size ($D_{50}$) may be measured using, for example, a laser diffraction method. For example, according to a method of measuring the average particle size ($D_{50}$) of the positive electrode active material, the average particle size ($D_{50}$) corresponding to 50% of volumetric accumulation in a measurement device may be calculated after particles of positive electrode active materials are dispersed in a dispersion medium, and introducing the dispersed product to a commercially available laser diffraction particle size measurement device (e.g., Microtrac MT 3000) to apply an ultrasonic wave of about 28 kHz at an output of 60 W.

More preferably, a ratio of the average particle sizes ($D_{50}$) of the first positive electrode active material and the second positive electrode active material may be 5:1 to 2:1, most preferably 4:1 to 2.5:1. When the above range of the ratio of the average particle sizes ($D_{50}$) of the first positive electrode active material and the second positive electrode active material is satisfied, a void between the particles of the positive electrode active materials may be more effectively reduced, a packing density may be increased, the density of the positive electrode may be enhanced, and the capacity per volume of the positive electrode may be effectively enhanced.

Specifically, the average particle size ($D_{50}$) of the first positive electrode active material may be 10 to 30 μm, more preferably, 13 to 25 μm, and most preferably 15 to 22 μm.

The average particle size ($D_{50}$) of the second positive electrode active material may be 1 to 10 μm, more preferably 2 to 8 μm, and most preferably 3 to 6 μM.

The first positive electrode active material and the second positive electrode active material of the present invention consist of a lithium composite transition metal oxide including at least two or more transition metals selected from the group consisting of Ni, Co and Mn. Here, the first positive electrode active material having large particles is a lithium composite transition metal oxide with a concentration gradient, and the second positive electrode active material having small particles is a lithium composite transition metal oxide without a concentration gradient. Likewise, by using a mixture of the large particle with a concentration gradient and the small particle without a concentration gradient, higher capacity and thermal stability may be ensured, the small particle without a concentration gradient may prevent the particle cracking of the large particle with a concentration gradient, thereby inhibiting a side reaction with the electrolyte solution.

The first positive electrode active material is a lithium composite transition metal oxide with the concentration gradient of a metal constituent, in which at least one of Ni, Co or Mn contained in the lithium composite transition metal oxide has a concentration difference of 1.5 mol % or more between the center and the surface of the lithium composite transition metal oxide. The concentration difference of Ni contained in the lithium composite transition metal oxide is preferably 2 mol % or more, and more preferably 3 mol % or more between the center and the surface of a particle of the lithium composite transition metal oxide.

In the present invention, the concentration gradient and concentration of a transition metal in the positive electrode active material may be identified using a method such as electron probe micro analysis (EPMA), inductively coupled plasma-atomic emission spectrometry (ICP-AES), time of flight secondary ion mass spectrometry (ToF-SIMS), EDAX through SEM analysis, or X-ray photoelectron spectroscopy (XPS), and specifically, the atomic ratio of metals may be measured while moving from the center of the positive electrode active material to the surface thereof using EPMA, or the atomic ratio of metals may be measured by performing etching from the surface of the positive electrode active material to the center thereof through XPS.

In an exemplary embodiment of the present invention, the first positive electrode active material may have a concentration gradient in which the concentration of at least one lithium composite transition metal oxide particle among Ni, Co and Mn contained in the lithium composite transition metal oxide is gradually changed from the center to the surface of the particle.

More preferably, the first positive electrode active material may have a concentration gradient in which the concentration of Ni is gradually reduced from the center to the surface of the lithium composite transition metal oxide particle. Since the Ni concentration is maintained at a high level at the center of the particle of the first positive electrode active material, and reduced toward the surface of the particle, thermal stability may be exhibited, and a decrease in capacity may be prevented.

Alternatively, at least one of Mn or Co may have a concentration gradient in which the concentration of the lithium composite transition metal oxide particle may be gradually increased from the center to the surface of the particle. In this case, since the Mn concentration is maintained at a low level at the center of the particle of the first positive electrode active material, and increased toward the particle surface, and excellent thermal stability may be obtained without a decrease in capacity. Since the Co concentration may be maintained at a low level at the center of the particle of the first positive electrode active material, and increased toward the particle surface, the amount of Co used may be reduced, and a decrease in capacity may be prevented.

The first positive electrode active material according to an exemplary embodiment of the present invention may have a continuous concentration gradient in which a Ni concentration included in the first positive electrode active material is reduced from the center to the surface layer of a particle thereof, and a continuous concentration gradient complementary to the concentration gradient of Ni, in which the concentration of at least one of Mn or Co is increased from the center to the surface of the particle. Likewise, due to the concentration gradient of a composition, in which the Ni concentration is gradually decreased and the Mn and/or Co concentration(s) are gradually increased from the center to the surface of the particle in the first positive electrode active material, a capacity characteristic may be maintained, and thermal stability may be exhibited.

In the present invention, the "exhibiting a concentration gradient such that the concentration of a transition metal is gradually changed (increased or decreased)" means that there is a concentration distribution in which the concentration of a transition metal is gradually changed throughout the particles. Specifically, the concentration distribution shows that the difference in transition metal concentration per 1 μm in particles may be 0.1 to 5 mol %, more specifically, 0.1 to 3 mol %, and further more specifically, 1 to 2 mol % based on the total mole number of the corresponding metal included in the positive electrode active material.

As the first positive electrode active material having large particles has a concentration gradient in which the concentration of a transition metal element varies depending on a location in the particle, the characteristic of the corresponding transition metal may be easily used to further enhance the battery performance improvement effect of the positive electrode active material. In addition, according to an exemplary embodiment of the present invention, when the transition metal in the first positive electrode active material particle has a concentration gradient in which the concentration of the transition metal in the particle is continuously changed, there is no drastic phase boundary region from the start point of the shell part to the end point thereof, and therefore a crystal structure may be stabilized, and thermal stability may be increased. In addition, when the slope of the concentration gradient of the transition metal is constant, the effect of improving the structural stability can be further enhanced.

Meanwhile, the second positive electrode active material is a lithium composite transition metal oxide without the concentration gradient of a metal constituent, which includes at least one of Ni, Co or Mn.

According to an exemplary embodiment of the present invention, the first positive electrode active material and the second positive electrode active material may be a lithium composite transition metal oxide which includes N, Co, and at least one selected from the group consisting of Mn and Al. For example, the first positive electrode active material and the second positive electrode active material may be an NCM-based lithium composite transition metal oxide including Ni, Co and Mn, an NCA-based lithium composite transition metal oxide including Ni, Co and Al, or a 4-component-based lithium composite transition metal oxide essentially including four components such as Ni, Co, Mn and Al.

In addition, the first positive electrode active material and the second positive electrode active material according to an exemplary embodiment of the present invention may be a high-Ni positive electrode active material in which a Ni content among the entire metal elements contained in the lithium composite transition metal oxide may be 60 mol % or more. The Ni content among the entire metal elements is preferably 70 mol % or more, and more preferably 80 mol % or more. When the high-Ni first and second positive electrode active materials having a Ni content among the entire metal elements of 60 mol % or more are used, a higher capacity may be ensured.

Meanwhile, the first and second positive electrode active materials may be lithium composite transition metal oxides with the same or different compositions. More specifically, the first and second positive electrode active materials may be a lithium composite transition metal oxide represented by Formula 1 below.

 [Formula 1]

In this formula, $M^a$ is at least one or more elements selected from the group consisting of Mn and Al, $M^b$ is at least one or more elements selected from the group consisting of Ba, Ca, Zr, Ti, Mg, Ta, Nb, and Mo, $M^c$ is at least one or more elements selected from the group consisting of Al, Zr, Ti, Mg, Ta, Nb, Mo and Cr, and $0.9 \leq p \leq 1.5$, $0 < x1 \leq 0.4$, $0 < y1 \leq 0.4$, $0 \leq z1 \leq 0.1$, $0 \leq q1 \leq 0.1$ and $0 < x1+y1+z1 \leq 0.4$.

In the lithium composite transition metal oxide of Formula 1, Li may be included at a content p, that is, $0.9 \leq p \leq 1.5$. When p is less than 0.9, there is a possibility of capacity being reduced, and when p is more than 1.5, since particles are sintered in the calcination process, it may be difficult to prepare a positive electrode active material. In consideration of a balance of the significant improvement in capacity characteristic of the positive electrode active material according to the control of a Li content and the calcination property in the preparation of the active material, it is more preferable that Li is included at a content of $1.0 \leq p \leq 1.15$.

In the lithium composite transition metal oxide of Formula 1, Ni may be included at a content corresponding to $1-(x1+y1+z1)$, in which, for example, $0.6 \leq 1-(x1+y1+z1) < 1$. When the Ni content in the lithium composite transition metal oxide of Formula 1 is 0.6 or more, a sufficient Ni amount for contributing to charging and discharging may be ensured to achieve high capacity. More preferably, Ni may be contained at $0.8 \leq 1-(x1+y1+z1) \leq 0.99$.

In the lithium composite transition metal oxide of Formula 1, Co may be included at a content x1, that is, $0 < x1 \leq 0.4$. When the Co content in the lithium composite transition metal oxide of Formula 1 is more than 0.4, additional costs may incur. In consideration of the significant improvement of a capacity characteristic according to the inclusion of Co, Co is more specifically included at $0.05 \leq x1 \leq 0.2$.

In the lithium composite transition metal oxide of Formula 1, $M^a$ may be Mn or Al, or Mn and Al, and these metal elements may enhance the stability of the active material, resulting in an improvement of the stability of a battery. In consideration of the effect of improving a lifespan characteristic, $M^a$ may be included at a content y1, that is, $0 < y1 \leq 0.4$. When y1 of the lithium composite transition metal oxide of Formula 1 is more than 0.4, the output characteristic and the capacity characteristic of the battery may rather be deteriorated, and $M^a$ is more specifically included at $0.05 \leq y1 \leq 0.2$.

In the lithium composite transition metal oxide of Formula 1, $M^b$ may be a doping element included in the crystal structure of the lithium composite transition metal oxide, and $M^b$ may be included at a content z1, that is, $0 \leq z1 \leq 0.1$.

In the lithium composite transition metal oxide of Formula 1, the metal element of $M^c$ may not be included in the structure of the lithium composite transition metal oxide, and a lithium composite transition metal oxide onto which $M^c$ is doped may be prepared by adding an to a precursor and a lithium source and calcining the $M^c$ source together with the precursor and the lithium source during mixing and calcination of a precursor and a lithium source, or forming a lithium composite transition metal oxide and then performing calcination with a separately added $M^c$ source. $M^c$ may be included at a content q1, that is, $0 \leq q1 \leq 0.1$, without degrading the characteristics of the positive electrode active material.

Meanwhile, since the second positive electrode active material having small particles may have poor thermal stability, a coating layer including a lithium oxide containing at least one or more selected from the group consisting of boron (B) and Mn may be provided at least a part of the surface of the particle of the second positive electrode active material. For example, the coating layer of the second positive electrode active material may include a lithium boron oxide such as $LiBO_2$, $Li_2B_4O_7$ or $LiB_3O_5$, a lithium manganese oxide such as $LiMn_2O_4$, or a mixture thereof.

In an exemplary embodiment of the present invention, the first and second positive electrode active materials may be mixed in a mixing ratio of 9:1 to 1:9, more preferably, 8:2 to 3:7, and most preferably 8:2 to 5:5. By using a mixture of the first positive electrode active material which is a large particle and has a concentration gradient, and the second positive electrode active material which is a small particle and does not have a concentration gradient, the electrode density of the positive electrode may be increased, high capacity and excellent thermal stability may be ensured, and a side reaction with an electrolyte solution may be inhibited. Therefore, a lithium secondary battery produced using the above-described positive electrode active material may have high capacity, and may be enhanced in a battery characteristic such as a lifespan characteristic.

According to another exemplary embodiment of the present invention, a positive electrode for a lithium secondary battery and a lithium secondary battery, which includes the positive electrode material, are provided.

Specifically, the positive electrode includes a positive electrode current collector, and a positive electrode mix layer formed on the positive current collector and including the positive electrode material.

In the positive electrode, the positive electrode current collector is not particularly limited as long as it does not cause a chemical change in a battery and has conductivity, and may be stainless steel, aluminum, nickel, titanium, calcined carbon, or aluminum or stainless steel which is surface-treated with carbon, nickel, titanium or silver. In addition, the positive electrode current collector may generally have a thickness of 3 to 500 μm, and the adhesive strength of the positive electrode active material may be increased by forming fine irregularities on the surface of the positive electrode current collector. For example, the positive electrode current collector may be used in various forms such as a film, a sheet, a foil, a net, a porous body, foam, a non-woven fabric, etc.

In addition, the positive electrode mix layer may include a conductive material and a binder as well as the positive electrode material described above.

Here, the conductive material is used to provide conductivity to an electrode, and is not particularly limited as long as it has electron conductivity without causing a chemical change in a battery. A specific example of the conductive material may be a graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may generally be contained at 1 to 30 wt % with respect to the total weight of the positive electrode active material layer.

In addition, the binder serves to enhance the cohesion between the positive electrode active material particles and the adhesive strength between the positive electrode active material and the positive electrode current collector. A specific example of the binder may be polyvinylidenefluoride (PVDF), a vinylidenefluoride-hexafluoropropylene-copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluorine rubber, or various copolymers thereof, and one or a mixture of two or more thereof may be used. The binder may be included at 1 to 30 wt % with respect to the total weight of the positive electrode active material layer.

The positive electrode may be prepared according to a conventional method of preparing a positive electrode, except that the above-described positive electrode material is used. Specifically, the positive electrode may be prepared by applying a composition for forming a positive electrode mix layer, which includes the above-described positive electrode active material, and selectively, a binder and a conductive material on the positive electrode current collector, and drying and rolling the composition. Here, the types and contents of the positive electrode active material, the binder and the conductive material are as described above.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then offering a viscosity for exhibiting excellent thickness uniformity when the slurry is applied to prepare a positive electrode.

As another method, the positive electrode may be prepared by casting the composition for forming the positive electrode mix layer on a separate support, and laminating a film obtained by delamination thereof from the support on the positive electrode current collector.

According to still another exemplary embodiment of the present invention, an electrochemical device including the positive electrode is provided. The electrochemical device may be specifically a battery or a capacitor, more specifically, a lithium secondary battery.

The lithium secondary battery specifically includes a positive electrode, a negative electrode located opposite to the positive electrode, a separator interposed between the positive electrode and the negative electrode and an electrolyte, and the positive electrode is as described above. In addition, the lithium secondary battery may selectively include a battery case for accommodating an electrode assembly including the positive electrode, the negative electrode and the separator, and a sealing member for sealing the battery case.

In the lithium secondary battery, the negative electrode includes a negative electrode current collector and a negative electrode mix layer located on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby reinforcing the binding strength of the negative electrode active material. For example, the negative electrode current collector may be used in various forms such as a film, a sheet, a foil, a net, a porous body, foam, a nonwoven fabric, etc.

The negative electrode mix layer selectively includes a binder and a conductive material as well as the negative electrode active material. For example, the negative electrode mix layer may be prepared by applying a composition for forming a negative electrode, which includes the negative electrode active material, and selectively a binder and a conductive material on a negative electrode current collector and drying the composition, or casting the composition for forming the negative electrode on a separate support and laminating a film obtained by delamination thereof from the support on the negative electrode current collector.

As the negative electrode active material, a compound enabling the reversible intercalation and deintercalation of lithium may be used. A specific example of the negative electrode active material may be a carbon-based material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and undoping lithium such as $SiO_\beta$ ($0<\beta<2$), $SnO_2$, vanadium oxide, or lithium vanadium oxide; or a composite including the metallic compound and the carbon-based material such as a Si—C composite or a Sn—C composite, and any one or a mixture of two or more thereof may be used. In addition, as the negative electrode active material, a metal lithium thin film may be used. In addition, as a carbon material, both of low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high temperature calcined carbon such as petroleum or coal tar pitch derived cokes.

In addition, the binder and the conductive material may be the same as described above for the positive electrode.

Meanwhile, in the lithium secondary battery, a separator is not particularly limited as long as it is generally used in a lithium secondary battery to separate a negative electrode from a positive electrode and provide a moving path for lithium ions, and particularly, the separator has a low resistance to ion mobility of an electrolyte and an excellent ability to be saturated in an electrolyte solution. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a melt-type inorganic electrolyte, which can be used in production of a lithium secondary battery, but the present invention is not limited thereto.

Specifically, the electrolyte may include an organic solvent and a lithium salt.

The organic solvent is not particularly limited as long as it can serve as a medium enabling the mobility of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate having high ion conductivity and high permittivity to increase the charge/discharge performance of a battery (for example, ethylene carbonate or propylene carbonate) and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, LiCF$_3$SO$_3$, LiC$_4$F$_9$SO$_3$, LiN(C$_2$F$_5$SO$_3$)$_2$, LiN(C$_2$F$_5$SO$_2$)$_2$, LiN(CF$_3$SO$_2$)$_2$. LiCl, LiI, or LiB(C$_2$O$_4$)$_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance a lifespan characteristic of the battery, inhibit a decrease in battery capacity, and enhance discharge capacity of the battery, the electrolyte may further include one or more types of additives, for example, a haloalkylenecarbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, an excellent output characteristic and excellent capacity retention, it is useful in portable devices such as a mobile phone, a notebook computer and a digital camera and an electric automobile field such as a hybrid electric vehicle (HEV).

Therefore, according to yet another exemplary embodiment of the present invention, a battery module including the lithium secondary battery as a unit cell, and a battery pack including the same are provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, embodiments of the present invention will be described in detail with reference to the accompanying drawings so that those of ordinary skill in the art can easily carry out the present invention. However, the present invention may be implemented in a variety of different forms, and is not limited to the embodiments described herein.

Example 1

As a first positive electrode active material, a lithium composite transition metal oxide which is a particle of LiNi$_{0.88}$Co$_{0.10}$Mn$_{0.02}$O$_2$ (D$_{50}$=16 μm), had a Ni content of 89 mol % at the particle center and a Ni content of 86 mol % at the particle surface, and had a concentration gradient in which the Ni concentration was gradually decreased and Co and Mn concentrations were gradually increased from the center to the surface of the particle was used.

As a second positive electrode active material, a lithium composite transition metal oxide which was a particle of LiNi$_{0.88}$Co$_{0.10}$Mn$_{0.02}$O$_2$ (D$_{50}$=5 μm) and did not have a concentration gradient was used.

The first positive electrode active material and the second positive electrode active material were mixed in a weight ratio of 8:2 before use, and such a positive electrode material, a carbon black conductive material and a PVdF binder were mixed in an N-methylpyrrolidone solvent in a weight ratio of 96.5:1.5:2.0, thereby forming a composition for forming a positive electrode, and the composition was applied to one surface of an aluminum current collector, dried at 130° C. and rolled, thereby preparing a positive electrode.

Example 2

A positive electrode was prepared in the same manner as described in Example 1, except that, as a first positive electrode active material, a lithium composite transition metal oxide which was a particle of LiNi$_{0.92}$Co$_{0.04}$Mn$_{0.04}$O$_2$ (D$_{50}$=14 μm), had a Ni content of 93 mol % at the particle center and a Ni content of 90 mol % at the particle surface, and had a concentration gradient in which the Ni concentration was gradually decreased and Co and Mn concentrations were gradually increased from the center to the surface of the particle was used, and as a second positive electrode active material, a lithium composite transition metal oxide which is a particle of LiNi$_{0.92}$Co$_{0.04}$Mn$_{0.04}$O$_2$ (D$_{50}$=4 μm), did not have a concentration gradient, and forms a coating layer including a lithium boron oxide on the particle surface was used.

Example 3

A positive electrode was prepared in the same manner as described in Example 1, except that, as a first positive electrode active material, a lithium composite transition metal oxide which is a particle of LiNi$_{0.87}$Co$_{0.08}$Mn$_{0.03}$Al$_{0.02}$O$_2$ (D$_{50}$=16 μm), had a Ni content of 88 mol % at the particle center and a Ni content of 86 mol % at the particle surface, and had a concentration gradient in which the Ni concentration was gradually decreased and Co and Mn concentrations were gradually increased from the center to the surface of the particle was used, and as a second positive electrode active material, a lithium composite transition metal oxide which is a particle of LiNi$_{0.88}$Co$_{0.09}$Mn$_{0.03}$O$_2$ (D$_{50}$=5 μm), did not have a concentration gradient, and included a coating layer including a lithium boron oxide formed on the particle surface was used.

Example 4

A positive electrode was prepared in the same manner as described in Example 1, except that, as a first positive electrode active material, a lithium composite transition metal oxide which is a particle of LiNi$_{0.70}$Co$_{0.10}$Mn$_{0.20}$O$_2$ (D$_{50}$=16 μm), had a Ni content of 72 mol % at the particle center and a Ni content of 69 mol % at the particle surface, and had a concentration gradient in which the Ni concentration was gradually decreased and Co and Mn concentrations were gradually increased from the center to the surface of the particle was used, and as a second positive electrode active material, a lithium composite transition metal oxide which is a particle of LiNi$_{0.70}$Co$_{0.10}$Mn$_{0.20}$O$_2$ (D$_{50}$=5 μm), did not have a concentration gradient, and included a coating layer including a lithium boron oxide formed on the particle surface was used.

Comparative Example 1

A positive electrode was prepared in the same manner as described in Example 1, except that, as a first positive electrode active material, a monomodal lithium composite transition metal oxide which was a particle of LiNi$_{0.88}$Co$_{0.10}$Mn$_{0.02}$O$_2$ (D$_{50}$=12 μm), had a Ni content of 89 mol % at the particle center and a Ni content of 87 mol % at the particle surface, and had a concentration gradient in which the Ni concentration was gradually decreased and Co and Mn concentrations were gradually increased from the center to the surface of the particle was used.

Comparative Example 2

A positive electrode was prepared in the same manner as described in Example 1, except that, as a first positive electrode active material, a lithium composite transition metal oxide which was a particle of $LiNi_{0.83}Co_{0.11}Mn_{0.06}O_2$ ($D_{50}$=16 μm) and did not have a concentration gradient was used and as a second positive electrode active material, a lithium composite transition metal oxide which was a particle of $LiNi_{0.83}Co_{0.11}Mn_{0.06}O_2$ ($D_{50}$=5 μm) and did not have a concentration gradient was used.

Experimental Example 1: Evaluation of Rolling Density and Cracking of Large Particles The rolling density and the degree of cracking of large particles were evaluated for the positive electrodes prepared in Examples 1 to 4 and Comparative Examples 1 and 2, and the results are shown in Table 1.

The rolling density was measured by densely filling a cylindrical holder with a 5 g aliquot of each of the positive electrode active materials used in Examples 1 to 4 and Comparative Examples 1 and 2, and then measuring the density of powder at 2,000 kgf when a pressure of 400 kgf up to 2,000 kgf was applied by raising the pressure by 400 kgf.

The degree of cracking of large particles was observed using an energy dispersive X-ray spectrometer (EDS) attached to a scanning electron microscope (SEM), and more specifically, the cross-section of a rolled electrode was prepared as a specimen to observe particle distribution through EDS mapping at the same magnification. The number of cracked large particles among the total large particles in mapping was counted to estimate the degree of cracking of large particles.

TABLE 1

|  | Rolling density (g/cm³) | Cracking of large particles (%) |
| --- | --- | --- |
| Example 1 | 3.33 | 18 |
| Example 2 | 3.35 | 15 |
| Example 3 | 3.31 | 20 |
| Example 4 | 3.01 | 16 |
| Comparative Example 1 | 3.13 | 60 |
| Comparative Example 2 | 3.31 | 41 |

Referring to Table 1, Examples 1 to 3 using a mixture of a first positive electrode active material which was a large particle and had a concentration gradient and a second positive electrode active material which was a small particle and did not have a concentration gradient were enhanced in rolling density, compared with Comparative Example 1 using a monomodal positive electrode material. In addition, the degree of cracking of large particles was significantly decreased in Examples 1 to 4 use bimodal-type large and small particles, compared with Comparative Example 2 using large and small particles not having a concentration gradient.

Experimental Example 2: Evaluation of Side Reaction of Electrolyte and Leakage Current Lithium secondary battery half cells were produced using the positive electrodes prepared according to Examples 1 to 4 and Comparative Examples 1 and 2.

Specifically, a 300 μm lithium metal was used as a negative electrode.

An electrode assembly was prepared by interposing a porous polyethylene separator between the positive electrode and the negative electrode, which were previously prepared as described above, and disposed in a case, and then 80 μl of an electrolyte solution was injected into the case, thereby producing a lithium secondary battery. Here, the electrolyte solution was prepared by dissolving 1.0M lithium hexafluorophosphate ($LiPF_6$), and as additives, vinylene carbonate/propane sultone/ethylene sulfate (mixed volume ratio of VC/PS/Esa=3/0.5/1) in an organic solvent consisting of ethylene carbonate/dimethyl carbonate/methyl carbonate (mixed volume ratio of EC/DMC/EMC=3/4/3).

After 10-hour wetting, a lithium secondary battery half cell produced using each of the positive electrodes prepared according to Examples 1 to 4 and Comparative Examples 1 and 2 was subjected to formation by charging the half cell at a current of 0.2 C, proportional to the mass of the positive electrode active material, up to 4.25V and discharging it at the same current, that is, 0.2 C up to 2.5V. Subsequently, a leakage current was measured by a method of measuring a current level without maintaining a constant current when charging was performed at a constant current of 0.1 C up to 4.7V and then a voltage was maintained at 4.7V for 120 hours, and the results are shown in Table 2 below and FIG. 1. To compare the positive electrode active materials under the same conditions, the average leakage current level obtained by integrating the leakage current level generated for 120 hours and dividing the integrated value by 120 hours was used.

TABLE 2

|  | Example 1 | Example 2 | Example 3 | Example 4 | Comparative Example 1 | Comparative Example 2 |
| --- | --- | --- | --- | --- | --- | --- |
| Average leakage current (mAh/h, 120 hr) | 0.09 | 0.04 | 0.06 | 0.10 | 0.34 | 0.18 |

Referring to Table 2 and FIG. 1, it can be seen that the 120-hr average leakage current was significantly decreased in Examples 1 to 4 using a mixture of a first positive electrode active material which was a large particle and had a concentration gradient and a second positive electrode active material which was a small particle and did not have a concentration gradient, compared with Comparative Example 1 using a monomodal-type positive electrode active material. In addition, compared with Comparative Example 2 using large and small particles not having a concentration gradient, it can be confirmed that, in Examples 1 to 4, despite the bimodality of large and small particles, the average leakage current was considerably decreased, and a difference in leakage current became more prominent from about 100 hours. It is considered that this is because Examples 1 to 4 using the mixture of the first positive electrode active material which is a large particle and had a concentration gradient, and the second positive electrode active material which was a small particle and did not have a concentration gradient reduced cracking of large particles, thereby inhibiting a side reaction with the electrolyte solution.

Experimental Example 3: Evaluation of Lifespan Characteristic

As described in Experimental Example 2, for a lithium secondary battery half cell produced using each of the positive electrodes prepared according to Examples 1 to 4 and Comparative Examples 1 and 2, a capacity retention at the time of 30 cycles of charging/discharging at 45° C. and a current of 0.33 C was measured, thereby performing the evaluation of a high-temperature lifespan characteristic. The results are shown in Table 3 and FIG. 2.

TABLE 3

|  | Example 1 | Example 2 | Example 3 | Example 4 | Comparative Example 1 | Comparative Example 2 |
|---|---|---|---|---|---|---|
| High-temperature lifespan characteristic (Capacity Retention (%), 45° C., @30 cycles) | 96.2 | 94.7 | 93.1 | 96.8 | 92.1 | 88.7 |

Figure 2:
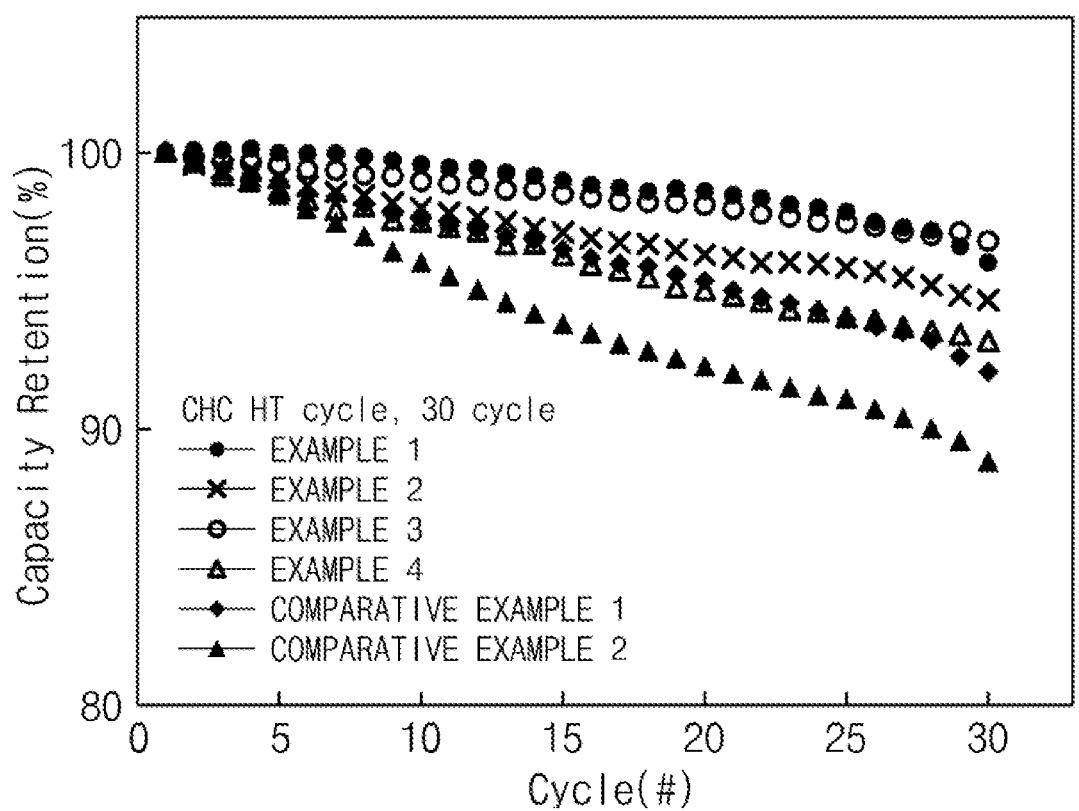
FIG. 2 is a graph of evaluating the lifespan characteristic for lithium secondary battery cells using a positive electrode, which are produced according to examples and comparative examples.

Referring to Table 3 and FIG. 2, compared with Comparative Example 1 using monomodal particles having a concentration gradient or Comparative Example 2 using bimodal large and small particles without having a concentration gradient, in Examples 1 to 4 using a mixture of the first positive electrode active material which was a large particle and had a concentration gradient and a second positive electrode active material which was a small particle and did not have a concentration gradient, an excellent high-temperature lifespan characteristic resulted from the inhibition of a side reaction with the electrolyte solution by reducing cracking of large particles.

The invention claimed is:

1. A positive electrode material for a secondary battery, comprising:
    a first positive electrode active material and a second positive electrode active material,
    wherein each of the first positive electrode active material and the second positive electrode active material consists of a lithium composite transition metal oxide including two or more transition metals selected from the group consisting of nickel (Ni), cobalt (Co) and manganese (Mn),
    an average particle size ($D_{50}$) of the first positive electrode active material is at least two times larger than that of the second positive electrode active material, and
    the first positive electrode active material has a concentration gradient in which at least one of Ni, Co or Mn contained in the lithium composite transition metal oxide has a concentration difference of 1.5 mol % or more between a center and a surface of a particle of the lithium composite transition metal oxide,
    wherein the second positive electrode active material further comprises a coating layer on at least a part of the surface of the particle,
    the coating layer comprises a lithium oxide containing at least one or more selected from the group consisting of boron (B) and manganese (Mn), and
    wherein the lithium composite transition metal oxide of the second positive electrode active material is without a concentration gradient.

2. The positive electrode material according to claim 1, wherein the first positive electrode active material has the concentration gradient in which a concentration of at least one of Ni, Co or Mn contained in the lithium composite transition metal oxide is gradually changed at a rate of 0.1 to 5 mol % per 1 μm from the center to the surface of the particle of the lithium composite transition metal oxide based on a total mole number of the corresponding metal included in the positive electrode active material.

3. The positive electrode material according to claim 1, wherein the first positive electrode active material has the concentration gradient in which a concentration of Ni is gradually decreased at a rate of 0.1 to 5 mol % per 1 μm from the center to the surface of the particle of the lithium composite transition metal oxide based on a total mole number of Ni included in the positive electrode active material.

4. The positive electrode material according to claim 1, wherein the first positive electrode active material has the concentration gradient in which a concentration of at least one of Mn or Co is gradually increased at a rate of 0.1 to 5 mol % per 1 μm from the center to the surface of the particle of the lithium composite transition metal oxide based on a total mole number of Mn or Co, respectively, included in the positive electrode active material.

5. The positive electrode material according to claim 1, wherein the first positive electrode active material and the second positive electrode active material have a Ni content of 60 mol % or more, among entire non-lithium metal elements contained in the lithium composite transition metal oxide.

6. The positive electrode material according to claim 1, wherein the first positive electrode active material and the second positive electrode active material include a lithium composite transition metal oxide containing Ni, Co, Mn and Al.

7. The positive electrode material according to claim 1, wherein the first positive electrode active material and the second positive electrode active material are represented by Formula 1 below:

$$Li_pNi_{1-(x1+y1+z1)}Co_{x1}M^a{}_{y1}M^b{}_{z1}M^c{}_{q1}O_2 \qquad \text{[Formula 1]}$$

where $M^a$ is at least one or more elements selected from the group consisting of Mn and Al, $M^b$ is at least one or more elements selected from the group consisting of Ba, Ca, Zr, Ti, Mg, Ta, Nb, and Mo, $M^c$ is at least one or more elements selected from the group consisting of Al, Zr, Ti, Mg, Ta, Nb, Mo and Cr, and $0.9 \leq p \leq 1.5$, $0 < x1 \leq 0.4$, $0 < y1 \leq 0.4$, $0 \leq z1 \leq 0.1$, $0 \leq q1 \leq 0.1$, and $0 < x1+y1+z1 \leq 0.4$.

8. The positive electrode material according to claim 1, wherein the first positive electrode active material and the second positive electrode active material are lithium composite transition metal oxides with same or different compositions.

9. The positive electrode material according to claim 1, wherein a ratio of the average particle sizes ($D_{50}$) of the first positive electrode active material and the second positive electrode active material is 5:1 to 2:1.

10. The positive electrode material according to claim 1, wherein the average particle size ($D_{50}$) of the first positive electrode active material is 10 to 30 µm.

11. The positive electrode material according to claim 1, wherein the average particle size ($D_{50}$) of the second positive electrode active material is 1 to 10 µm.

12. The positive electrode material according to claim 1, wherein the first positive electrode active material and the second positive electrode active material are present in a weight ratio of 9:1 to 1:9.

13. The positive electrode material of claim 1, wherein the concentration difference is from 1.5 mol % to 3 mol %.

14. The positive electrode material of claim 1, wherein a difference in the concentration of the at least one of Ni, Co or Mn per 1 µm in particles is from 0.1 to 5 mol %.

15. A positive electrode for a secondary battery, comprising the positive electrode material according to claim 1.

16. A lithium secondary battery comprising the positive electrode according to claim 15.

17. A positive electrode material for a secondary battery, comprising:
a first positive electrode active material and a second positive electrode active material,
wherein each of the first positive electrode active material and the second positive electrode active material consists of a lithium composite transition metal oxide including two or more transition metals selected from the group consisting of nickel (Ni), cobalt (Co) and manganese (Mn),
an average particle size (D50) of the first positive electrode active material is at least two times larger than that of the second positive electrode active material, and
the first positive electrode active material has a concentration gradient in which at least one of Ni, Co or Mn contained in the lithium composite transition metal oxide has a concentration difference of 1.5 mol % or more between a center and a surface of a particle of the lithium composite transition metal oxide,
wherein the second positive electrode active material further comprises a coating layer on at least a part of the surface of the particle,
the coating layer comprises a lithium oxide containing at least one or more selected from the group consisting of boron (B) and manganese (Mn), and
wherein the first positive electrode active material has the concentration gradient in which a concentration of at least one of Mn or Co is gradually increased at a rate of 0.1 to 5 mol % per 1 µm from the center to the surface of the particle of the lithium composite transition metal oxide based on a total mole number of Mn or Co, respectively, included in the positive electrode active material.

18. The positive electrode material of claim 17, wherein the first positive electrode active material has the concentration gradient in which a concentration of at least one of Ni, Co or Mn contained in the lithium composite transition metal oxide is gradually changed at a rate of 0.1 to 5 mol % per 1 µm from the center to the surface of the particle of the lithium composite transition metal oxide based on a total mole number of the corresponding metal included in the positive electrode active material.

19. The positive electrode material of claim 17, wherein the first positive electrode active material has the concentration gradient in which a concentration of Ni is gradually decreased at a rate of 0.1 to 5 mol % per 1 µm from the center to the surface of the particle of the lithium composite transition metal oxide based on a total mole number of Ni included in the positive electrode active material.

20. The positive electrode material of claim 17, wherein the first positive electrode active material and the second positive electrode active material have a Ni content of 60 mol % or more, among entire non-lithium metal elements contained in the lithium composite transition metal oxide.

* * * * *